United States Patent Office 3,325,468
Patented June 13, 1967

3,325,468
DISAZO PYRAZOLYL DYESTUFFS
Jean-Pierre Jung, Riehen, near Basel, and Guido Schetty, Basel, Switzerland, assignors, by mesne assignments, to H. A. Whitten & Co., New York, N.Y., a partnership
No Drawing. Original application Dec. 10, 1962, Ser. No. 243,620, now Patent No. 3,197,455, dated July 27, 1965. Divided and this application July 3, 1963, Ser. No. 327,164
Claims priority, application Switzerland, Dec. 15, 1961, 14,557/61
5 Claims. (Cl. 260—160)

The present application is a division of copending application, Ser. No. 243,620, filed Dec. 10, 1962 now U.S. Patent No. 3,197,455.

The present invention concerns new disazo dyestuffs, processes for the production thereof, processes for the dyeing of fibres containing natural or synthetic polypeptide as well as, as industrial product, the material fast dyed with the aid of these dyestuffs.

It has been found that valuable dyestuffs are obtained by coupling
(a) two mols of a diazotised, negatively substituted amine D–NH$_2$ of the benzene series,
(b) with one mol of a coupling component of the Formula I

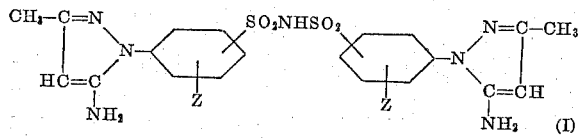

to form a disazo dyestuff of the general Formula II

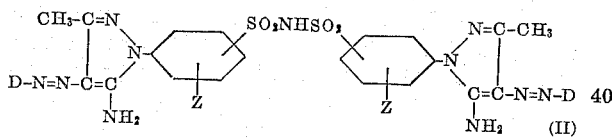

with the proviso that the total number of water-solubilizing groups is at least 1 and maximally 4.

D in Formula II represents an unsulfonated or monosulfonated phenyl radical with from one to two negative substituents and which can contain further substituents compatible with azo dyestuffs. In this specification and in the appended claims negative substituents in D mean the following substituents: trifluoromethyl, cyano and, especially those which contain an oxygen atom and the bond of which between the linking atom and the oxygen is semipolar, namely, the nitro, carboxy, lower alkyl-carbonyl, lower alkoxy carbonyl, as well as, in a preferred group of dyestuffs according to the invention, the sulphonyl-containing group of the formula

—SO$_2$R in which R is hydroxyl, phenyl, methylphenyl, chlorophenyl, phenoxy, methylphenoxy, chlorophenoxy, bromophenoxy, chloroacetylaminophenoxy, N-lower alkyl-N-phenyl-amino, and Z is preferably H, or chloro, bromo, methyl, ethyl or —SO$_3$H, with the proviso that the total number of —SO$_3$H groups is maximally 4.

"Lower alkyl" as used in this specification means alkyl with from 1 to 5 carbon atoms.

As additional substituents, the phenyl radical of the diazo components D usable according to the invention can also contain the following substituents compatible with azo dyestuffs: lower alkyl groups such as methyl, ethyl, n- or tert. butyl or tert. amyl; the benzyl, methylbenzyl or chlorobenzyl group; phenyl, lower alkyl phenyl, chloro phenyl, or bromophenyl; lower alkoxy groups such as methoxy, ethoxy, or butoxy; the benzyloxy group; phenoxy, alkylphenoxy with alkyl of maximally 8 carbon atoms, chlorophenoxy, bromophenoxy, phenylthio, alkylphenylthio with alkyl of maximally 8 carbon atoms, chlorophenylthio, or bromophenylthio; acylamino groups such as acetylamino, chloroacetylamino, β-bromopropionylamino, phenacetylamino, phenoxyacetylamino, benzoxylamino, chlorobenzoylamino, a triazinylamino or a dichloropyrimidylamino group; lower carbalkoxyamino groups such as the carbomethoxyamino, carboethoxyamino, carbobutoxyamino, carbocyclohexylamino group; finally chlorine, fluorine or bromine.

Particularly suitable diazo components are aminobenzene sulphonic acids, aminodiphenyl sulphones, aminobenzene sulphonic acid N-alkyl-N-phenyl-amides as well as aminodiphenylethers wherein all phenyl radicals can be free from or can contain sulphonic acid groups.

The diazotisation is performed in a known way, for example, in mineral acid, aqueous solution with the alkali metal salts of nitrous acid or in concentrated sulphuric acid with nitrosyl sulphuric acid.

The coupling components of the above Formula I usable according to the invention are bis-(pyrazolyl-phenyl)-disulphimides such as bis-[2-, 3- or 4- (3' - methyl - 5'-amino-pyrazolyl-(1')) - phenyl]disulphimide. These coupling components are new and they are obtained, for example, by condensing 2 mols of cyanoacetone or cyanoacetoneimine by known methods preferably in mineral acid, aqueous solution with a bis-hydrazine of Formula III

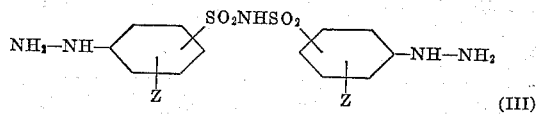

wherein Z has the meaning given in Formula II.

The diazotised amine is coupled at a temperature of about —10° to +50° C. and preferably at +10° to 25° C. with the bis-pyrazolyl compound of Formula I as defined above, advantageously in an aqueous-acid medium, while, if desired, gradually buffering the acid with an agent which raises the pH value, e.g. with an alkali metal salt of a low-molecular fatty acid such as sodium acetate and, if necessary, in the presence of organic solvents which are miscible with water such as low fatty acids, e.g. acetic acid, low fatty alcohols, e.g. methanol or ethanol or low aliphatic ketones such as acetone or also dioxan.

A modification of the process for the production of disazo dyestuffs according to the invention consists in coupling one mol of a diazotised, negatively substituted amine D–NH$_2$ of the benzene series with one mol of a compound of Formula IV

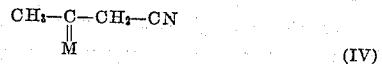

wherein M represents the oxo or the imino group, to form a monoazo dyestuff of Formula V

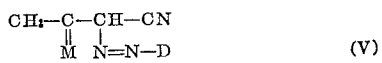

wherein D has the meaning given in Formula II, and condensing two mols of the monoazo dyestuff so obtained, in an acid aqueous medium, with one mol of a bis-hydrazine of Formula III to form a disazo dyestuff of Formula II.

The disazo dyestuffs of Formula II produced according to the invention are isolated in the form of their ammonium or alkali metal salts. As such they are yellow, orange to brown powders. They are excellently suitable for the dyeing and printing of natural and synthetic polypeptide fibres such as leather, silk or, principally, wool as well as of synthetic polyamide and polyurethane fibres such as nylon or Perlon. The dyeings obtained on these fibres are usually distinguished by the purity of their greenish yellow, yellow or orange shades, a food fastness to light and excellent fastness to alkali. They draw onto wool from a neutral to weakly acid bath and the wool dyeings obtained have very good fastness to washing, milling, sea water, chlorine, and rubbing.

Particularly those new disazo dyestuffs of Formula II according to the invention wherein D—NH$_2$ is an o-aminodiphenyl sulphone radical are preferred because of their excellent fastness to light and excellent fastness in the other above-listed wet treatments. Those wherein D—NH$_2$ is a m-aminobenzene sulphonyl- or a m-aminobenzene carbonyl radical are preferred because of their very pure, very greenish-yellow shade, and are therefore very valuable as combination dyestuffs, since they can be combined well with pure blue dyestuffs to give brilliant green shades.

Further details can be seen from the following examples. Where not otherwise expressly stated, parts are given as parts by weight. The temperatures are in degrees centigrade. The relationship of parts by weight to parts by volume is as that of grams to cubic centimeters.

Example 1

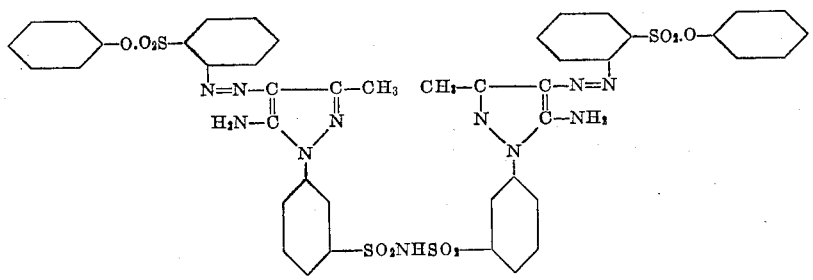

24.9 parts of 2-aminobenzene-1-sulphonic acid phenyl ester are suspended in 180 parts of glacial acetic acid, dissolved by the dropwise addition of 30 parts of concentrated hydrochloric acid and diazotized at 0–10° by the addition of 6.9 parts of sodium nitrite in 20 parts of ester. The diazo solution is slowly poured at 0–5° into a solution of 21.9 parts of bis-[3-(3'-methyl-5'-amino-pyrazolyl-(1'))-phenyl]-disulphimide and 25 parts of crystallized sodium acetate in 600 parts of water. The mixture is poured for several hours at 0–10°, 100 parts of sodium chloride are added, the precipitated dyestuff is filtered off and dried.

It is a yellow powder which dissolves in hot water with a greenish-yellow color. It dyes wool on boiling from a neutral to weakly acid bath containing ammonium sulphate in pure yellow very level shades which are fast to wet and light. The bath is well exhausted.

The bis - [3 - (3' - methyl - 5' - amino - pyrazolyl-(1'))-phenyl]-disulphimide used as coupling component is obtained by reacting 1 mol of 3,3'-bis-hydrazino-1,1'-diphenyl disulphimide with 2 mols of cyanoacetone imino in a hydrochloric acid aqueous solution.

Further dyestuffs according to the invention are given in the following Table I which are produced by using corresponding amounts of diazo and coupling components according to the methods described in Example 1.

TABLE I

| No. | Diazo component | Coupling component | Shade of wool dyeing |
|---|---|---|---|
| 1 | 2-amino-1,1'-diphenylsulphone | Bis-[3-(3'-methyl-5'-aminopyrazolyl-(1'))-phenyl]-disulphimide. | Yellow. |
| 2 | 3-aminobenzene-1-sulphonic acid-N-ethyl-N-phenylamide. | do | Greenish yellow. |
| 3 | 4-aminobenzene-1-sulphonic acid-(2'-methylphenyl)-ester. | do | Yellow. |
| 4 | 2-amino-4'-methyl-1,1'-diphenyl-disulphimide | do | Do. |
| 5 | 2-aminobenzene-1-sulphonic acid | do | Do. |
| 6 | 4-amino-diphenyl ether 3-sulphonic acid | Bis-[3-(3'-methyl-5'-amino pyrazolyl-(1'))-4-chlorophenyl]-disulphimide. | Yellow. |
| 7 | 3-amino-benzene-1-sulphonic acid phenyl ester | Bis-[3-(3'-methyl-5'-amino-pyrazolyl-(1'))-4-methylphenyl]-disulphimide. | Greenish yellow. |
| 8 | do | Bis-[3-(3'-methyl-5'-aminopyrazolyl-(1'))-4-ethylphenyl]-disulphimide. | Do. |
| 9 | 2-amino-1-1'-diphenylsulphone-3'-sulphonic acid | Bis-[4-(3'-methyl-5'-aminopyrazolyl-(1'))-3-methyl-5-chlorophenyl]-disulphimide. | Yellow. |
| 10 | do | Bis-[4-(3'-methyl-5'-aminopyrazolyl-(1'))-2-5'-dichlorophenyl]-disulphimide. | Do. |
| 11 | 4-aminobenzene-1-sulphonic acid-N-ethyl-N-4'-sulphophenylamide. | Bis-[4-(3'-methyl-5'-aminopyrazolyl-(1'))-2-methyl-5-chlorophenyl]-disulphimide. | Do. |
| 12 | do | Bis-[3-(3'-methyl-5'-aminopyrazolyl-(1'))-4-bromophenyl]-disulphimide. | Do. |
| 13 | 2-aminobenzene-1-sulphonic acid phenyl ester | Bis-[4-(3'-methyl-5'-aminopyrazolyl-(1'))-2-5-dibromophenyl]-disulphimide. | Do. |
| 14 | 2-amino-1-butoxycarbonylbenzene | Bis-[3-(3'-methyl-5'-aminopyrazolyl-(1'))-4-sulphophenyl]-disulphimide. | Do. |
| 15 | 3-amino-1-amyloxycarbonylbenzene | do | Greenish yellow. |

Other diazo components which may be used in lieu of those listed in the foregoing table are:

phenoxyphenyl
phenylsulfonylphenyl
methyl-phenylsulfonylphenyl
chloro-phenylsulfonylphenyl
phenoxy-sulfonylphenyl
lower alkyl-phenoxy-sulfonylphenyl
chloroacetylamino-phenoxysulfonylphenyl
chlorophenoxy-sulfonylphenyl
N-lower alkyl-N-phenylamino-sulfonylphenyl
methylphenyl-disulfimidophenyl
chlorophenyl-disulfimidophenyl
benzoylphenyl
dichlorotriazinylaminophenyl
lower alkoxycarbonylphenyl
phenyl
sulfo-phenyl
chloroacetylaminophenyl
nitrophenyl
carboxyphenyl and the phenyl nucleus of the above defined D linked directly to the adjacent azo bridge being substituted by a member selected from among hydrogen and lower alkyl.

What is claimed is:
1. A disazo dyestuff of the formula

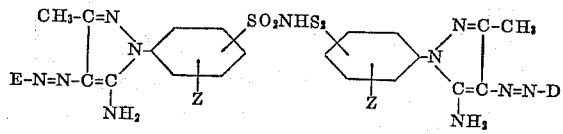

wherein the dyestuff molecule contains a maximum of four water-solubilizing groups, Z is a member selected from the group consisting of H, chloro, bromo, methyl, ethyl and —$SO_3H$, each D is a member selected from the group consisting of phenoxyphenyl
phenylsulfonylphenyl
methyl-phenylsulfonylphenyl
chloro-phenylsulfonylphenyl
phenoxy-sulfonylphenyl
lower alkyl-phenoxy-sulfonylphenyl
chloroacetylamino-phenoxysulfonylphenyl
chlorophenoxy-sulfonylphenyl
N-lower alkyl-N-phenylamino-sulfonylphenyl
methylphenyl-disulfimidophenyl
chlorophenyl-disulfimidophenyl
benzoylphenyl
dichlorotriazinylaminophenyl
lower alkoxycarbonylphenyl
phenyl
sulfo-phenyl
chloroacetylaminophenyl
nitrophenyl
carboxyphenyl and the phenyl nucleus of the above defined D linked directly to the adjacent azo bridge being substituted by a member selected from the group consisting of H and lower alkyl, each D being further substituted by from 0 to 1 sulfonic acid group.

2. A disazo dyestuff of the formula

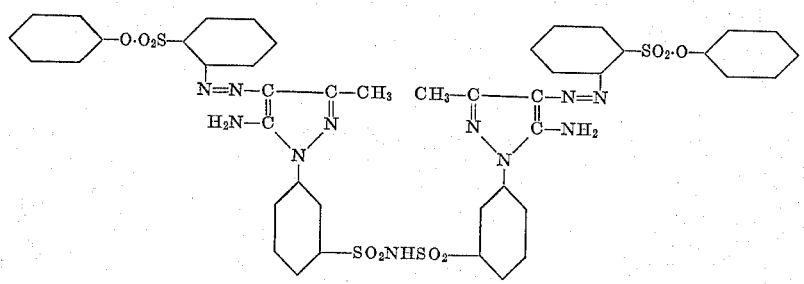

3. A disazo dyestuff of the formula

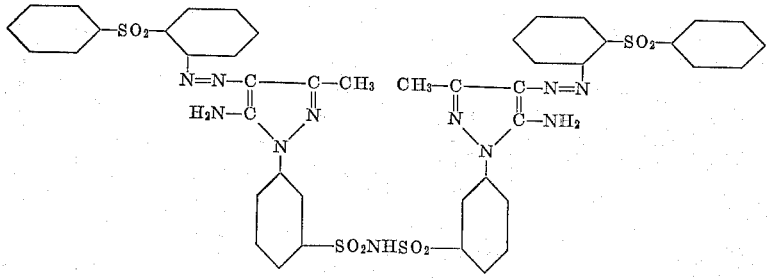

4. A disazo dyestuff of the formula

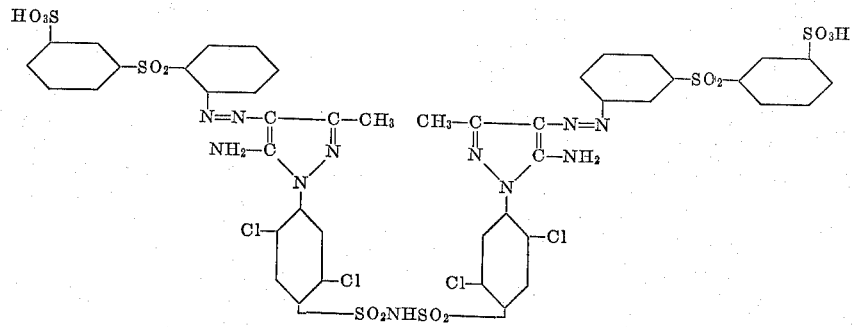

5. A disazo dyestuff of the formula
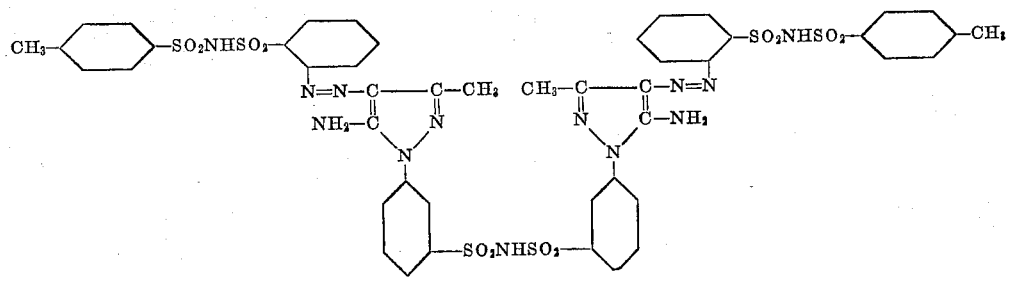
No references cited.
CHARLES B. PARKER, *Primary Examiner.*
R. J. FINNEGAN, DONALD M. PAPUGA,
*Assistant Examiners.*